(No Model.)
G. H. ALTON.
SCREW NUT.
No. 422,361. Patented Mar. 4, 1890.
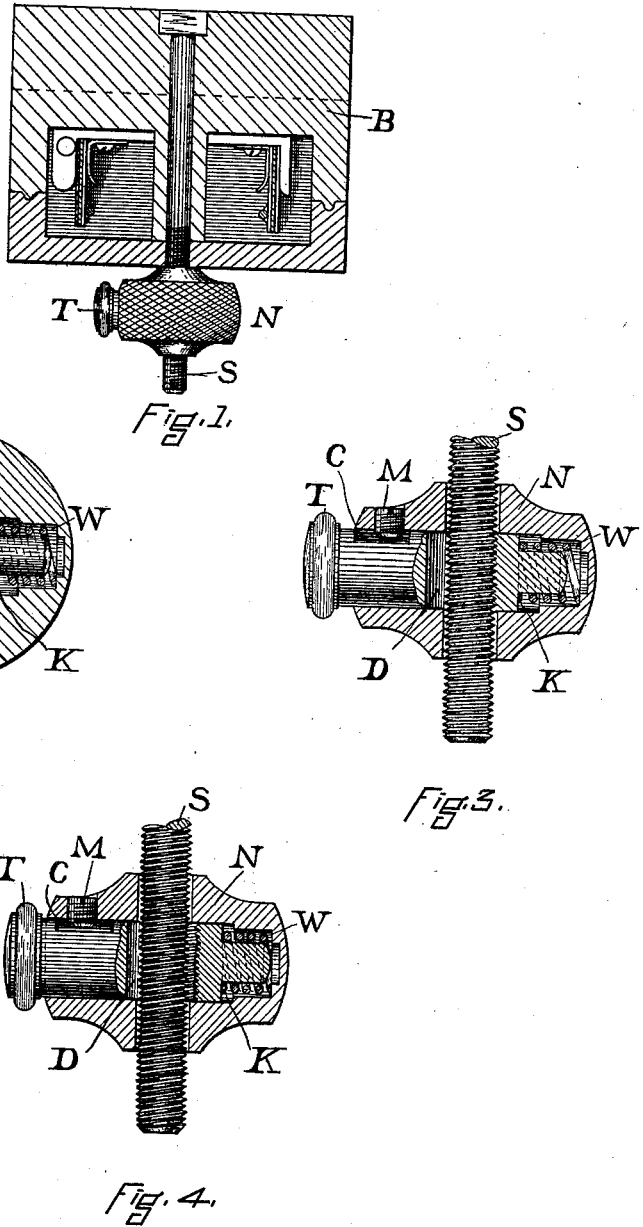
WITNESSES:
J. Wesley Gibboney
Albert L. Rohrer
INVENTOR
George Henry Alton

UNITED STATES PATENT OFFICE.

GEORGE HENRY ALTON, OF LYNN, MASSACHUSETTS, ASSIGNOR TO THE THOMSON-HOUSTON ELECTRIC COMPANY, OF CONNECTICUT.

SCREW-NUT.

SPECIFICATION forming part of Letters Patent No. 422,361, dated March 4, 1890.

Application filed November 4, 1889. Serial No. 329,147. (No model.)

*To all whom it may concern:*

Be it known that I, GEORGE HENRY ALTON, a citizen of the United States, residing in Lynn, in the county of Essex and Commonwealth of Massachusetts, have invented a new and useful Screw-Nut, of which the following is a specification.

My present invention relates to an improved form of nut for use with screws.

The object of my invention is to secure a nut which can be quickly screwed into place without the necessity of rotating it over the entire screw length to be traversed, and which in like manner can be readily removed also.

Another object of my invention is to secure a safety-nut—that is, one which is so constructed that it is impossible to cause it to exert an abnormal or dangerous pressure upon the device or apparatus with which it is used.

My invention is particularly useful where it is desirable to use a screw-and-nut fastening in position where the same are difficult of access—such, for instance, as the securing of a cover on a fuse-box, such fuse-boxes containing metal fuses for use with electric circuits, and which fuses are designed to melt upon a certain strength of current flowing. Such fuse-boxes are frequently secured to ceilings or upon walls, and are usually purposely placed in positions difficult of access for obvious reasons. Various ways of securing the covers to such fuse-boxes have been used, such as a lid which is threaded and can be screwed on or held in place by hooks or spring-catches. Hooks and catches are not, however, suited for this purpose, as they are found unreliable in practice, and frequently allow the lid of the box to drop off. Lids which screw on are also difficult to put on the box, because the operator must upon many occasions stand upon a ladder or other support, and can sometimes only reach the lid with outstretched arm.

It is to be understood that my invention is not limited to its use here mentioned in connection with fuse-boxes, as I cite this application of it merely as an example of its utility. It can be used to advantage in very many instances where like conditions exist, as is obvious.

In the drawings, which are enlarged for clearness, Figure 1 shows the external appearance of my invention and its application to a fuse-box, as mentioned. Fig. 2 is a horizontal section showing the construction. Figs. 3 and 4 are vertical sections illustrating the construction and action of the device.

In Fig. 1, B is a fuse-box, which may be considered as being in a place upon a ceiling and difficult of access. Suitable fuse-holding arrangements are shown, but need not be specifically described, as they form no part of my invention.

N is a nut, and T a thumb-piece which is threaded, and the operation of which instantly releases the nut N from the screw-rod S, so that it can be removed without any necessity for rotating it.

The releasing mechanism is shown in Figs. 2, 3, and 4. The nut-body N is drilled to receive the thumb-piece threaded portion T, as shown. The thumb-piece T has a hole drilled through it at D of sufficient diameter to receive the screw-threaded portion or screw proper S, with a considerable space allowed for play. The thumb-piece T is also shouldered at one end, as indicated at K, which shoulder forms a bearing for the spring W, and one side of the hole D is formed as a female thread to suit the screw on the portion S. The thumb-piece T is also recessed or milled out at the point C, so that a limiting-screw M, held in the nut-body N, permits a movement to be given to the thumb-piece T sufficient to engage or disengage the threaded portions, as desired. Thus in Fig. 3 the thumb-piece T is forced outwardly by the action of the spring W, and the threaded portions are in engagement. In this position the nut N can be moved in one or the other direction along the screw S by rotating it as ordinarily done. To disengage the threaded portions altogether, so that the nut N can be removed rapidly from the screw S without rotating it, it is only necessary to depress the thumb-piece T, as indicated in Fig. 4, when the threaded portions will become entirely free from each other. The nut N can thus be quickly placed in position near the lid of the fuse-box, Fig. 1, or in position in any other instance where such a nut would be desirable, and a slight rotation of it secures it firmly in place.

By applying a sufficient rotative effort to the nut N the thumb-piece T will be forced inwardly against the action of the spring W until the parts become disengaged and one thread of the screw S will be jumped. It is therefore evident that to gage or control the pressure which can be exerted by the nut N against any stationary part—such, for example, as the lid of the fuse-box B, Fig. 1—it is necessary to vary the strength of the spring W to suit any particular condition.

What I claim as my invention is—

1. The combination, in a nut for screws, of a threaded portion to fit the screw, a stop to limit its motion with respect to a retaining unthreaded portion to hold said threaded portion, and a spring to force said threaded portion against the screw.

2. In a nut for screws, an unthreaded portion N, a threaded encircling portion T, movable within the portion N and guiding it, a spring W, to force the portion T against the screw, and a limiting-stop M, as described.

Signed at Lynn, county of Essex, and Commonwealth of Massachusetts, this 1st day of November, A. D. 1889.

GEORGE HENRY ALTON.

Witnesses:
J. WESLEY GIBBONEY,
J. T. BRODERICK.